May 5, 1970            G. T. ELIASSEN            3,509,826

CONVEYOR SYSTEM

Original Filed Feb. 28, 1964            6 Sheets-Sheet 3

United States Patent Office 3,509,826
Patented May 5, 1970

---

3,509,826
CONVEYOR SYSTEM
Gunnar Thure Eliassen, Saffle, Sweden, assignor to Aktiebolaget Electrolux, Stockholm, Sweden, a corporation of Sweden
Original application Feb. 28, 1964, Ser. No. 348,213, now Patent No. 3,361,079, dated Jan. 2, 1968. Divided and this application Oct. 26, 1967, Ser. No. 678,228
Claims priority, application Sweden, Feb. 28, 1963, 2,226/63
Int. Cl. B61b 3/00; B65g 1/12; E01b 25/00
U.S. Cl. 104—88       8 Claims

ABSTRACT OF THE DISCLOSURE

This invention relates to an overhead conveyor system having tracks from which wheeled article carrying units are suspended. The system includes an article receiving track at one level, an article delivery track at a lower level, and a plurality of storage tracks to which the wheeled units are selectively transferred from the receiving track and from which the wheeled units are selectively transferred to the delivery track. The article receiving and delivery tracks have spaced gaps at which regions angularly movable switches are provided, the switches in one position closing the gaps and forming parts of the receiving and delivery tracks and in another position being at an angle to these tracks and arranged to transfer wheeled units to and from the upper and lower ends of the storage tracks. The wheeled units are moved on the delivery track by propelling members which are spaced apart and movable lengthwise of the track. In order to prevent malfunctioning of the conveyor system a particular switch on the delivery track cannot be moved from its position parallel to the track to its position at an angle to the track to receive a wheeled unit from the lower end of a storage track whenever one of the propelling members, even when it is not functioning to propel a wheeled unit, is moving along a zone of the track which includes the particular switch.

---

This application is a division of my application Ser. No. 348,213, filed Feb. 28, 1964, for "Conveyor System," now Patent No. 3,361,079, granted Jan. 2, 1968.

Brief summary of the invention

This invention relates to an overhead track system from which wheeled article carrying units are suspended and generally like a track system in a railroad hump yard, for example.

Overhead track systems of this kind often include an article receiving track at one level, an article delivery track at a lower level and a plurality of article storage paths to which the wheeled carrying units are selectively transferred from the receiving track and from which the wheeled carrying units are selectively transferred to the delivery track.

In accordance with my invention the article receiving and delivery tracks have spaced gaps at which regions angularly movable switches are provided, the switches in one position closing the gaps and forming parts of the receiving and delivery tracks and in another position being at an angle to these tracks and arranged to transfer wheeled units to and from the upper and lower ends of the storage tracks. Further, the wheeled carrying units are moved on the delivery track by propelling members which are spaced apart and movable lengthwise of the track.

It is an object of my invention to provide an improvement in a conveyor track system of this type whereby a particular switch on the delivery track cannot be moved from its position parallel to the track to its position at an angle to the track to receive a wheeled unit from the lower end of a storage track whenever one of the propelling members, even when it is not functioning to propel a wheeled unit, is moving along a zone of the delivery track which includes the particular switch.

The above and other objects and advantages of my invention will be better understood from the following description taken in connection with the accompanying drawing forming a part of the specification.

Detailed description

In FIGS. 1 to 7 I have diagrammatically illustrated apparatus embodying my invention which includes an article receiving line or path 10 to one end of which articles are supplied in a manner described hereinafter and from which articles are selectively distributed to a plurality of storage paths or lines 11, 12 and 13, and from which storage paths the articles are selectively removed to an article delivery line 14. Any number of storage paths or lines may be provided, and in the embodiment illustrated three such paths are shown.

Figure 1:
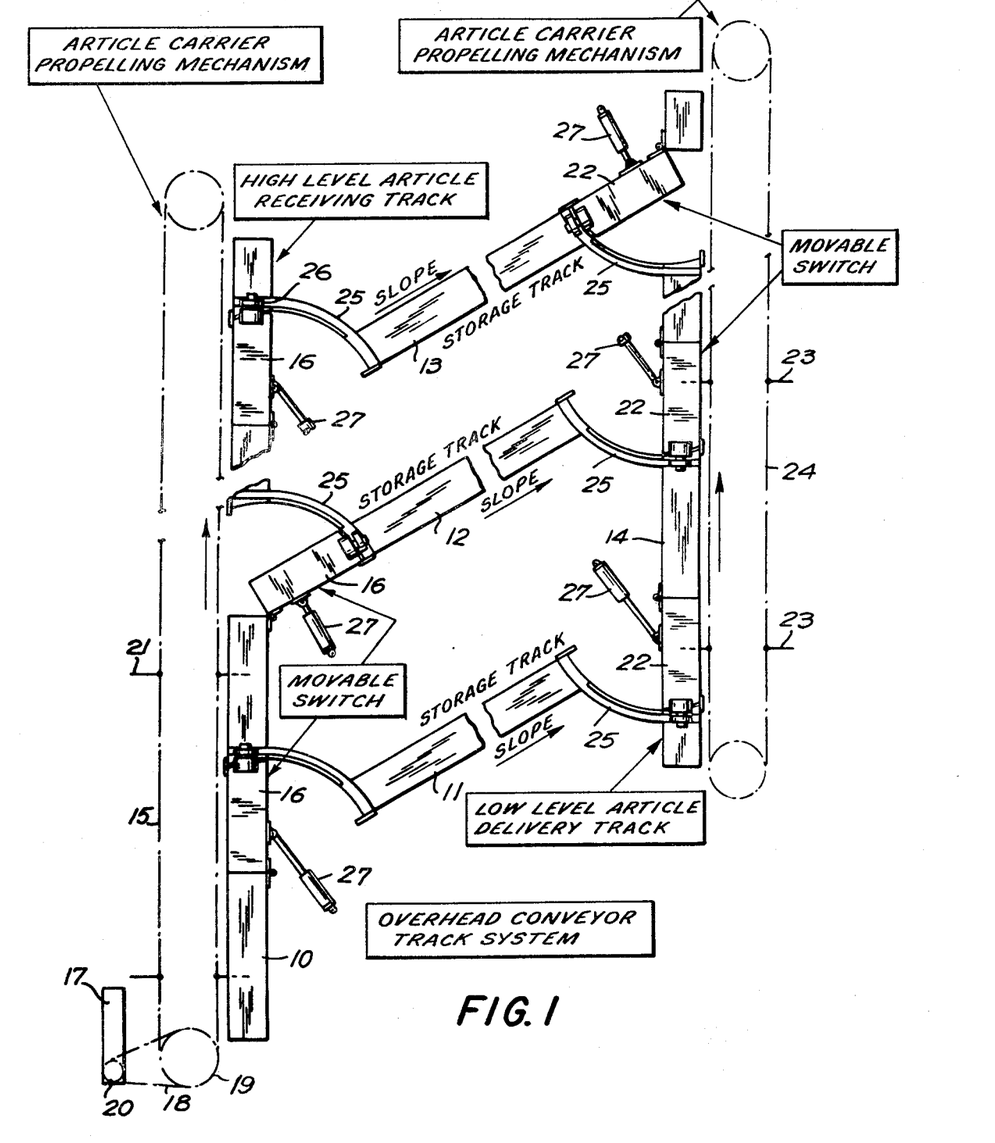
FIG. 1 is a top plan view diagrammatically illustrating an overhead conveyor track system, from which wheeled article carrying units depend downward from the tracks, which embodies my invention.

When a variety of articles are being moved on the article receiving line 10, for example, switch or transfer units 16 may be employed to transfer from the receiving line to each of the storage lines articles which are of the same kind or generally similar to one another. Each article is automatically transferred from the article receiving line or path 10 to a selected storage path by information received at a dispatching unit 17 which functions to cause a particular switch unit 16 to become operable to transfer a selected article automatically from the article receiving line 10 to a particular storage path.

Figure 6:
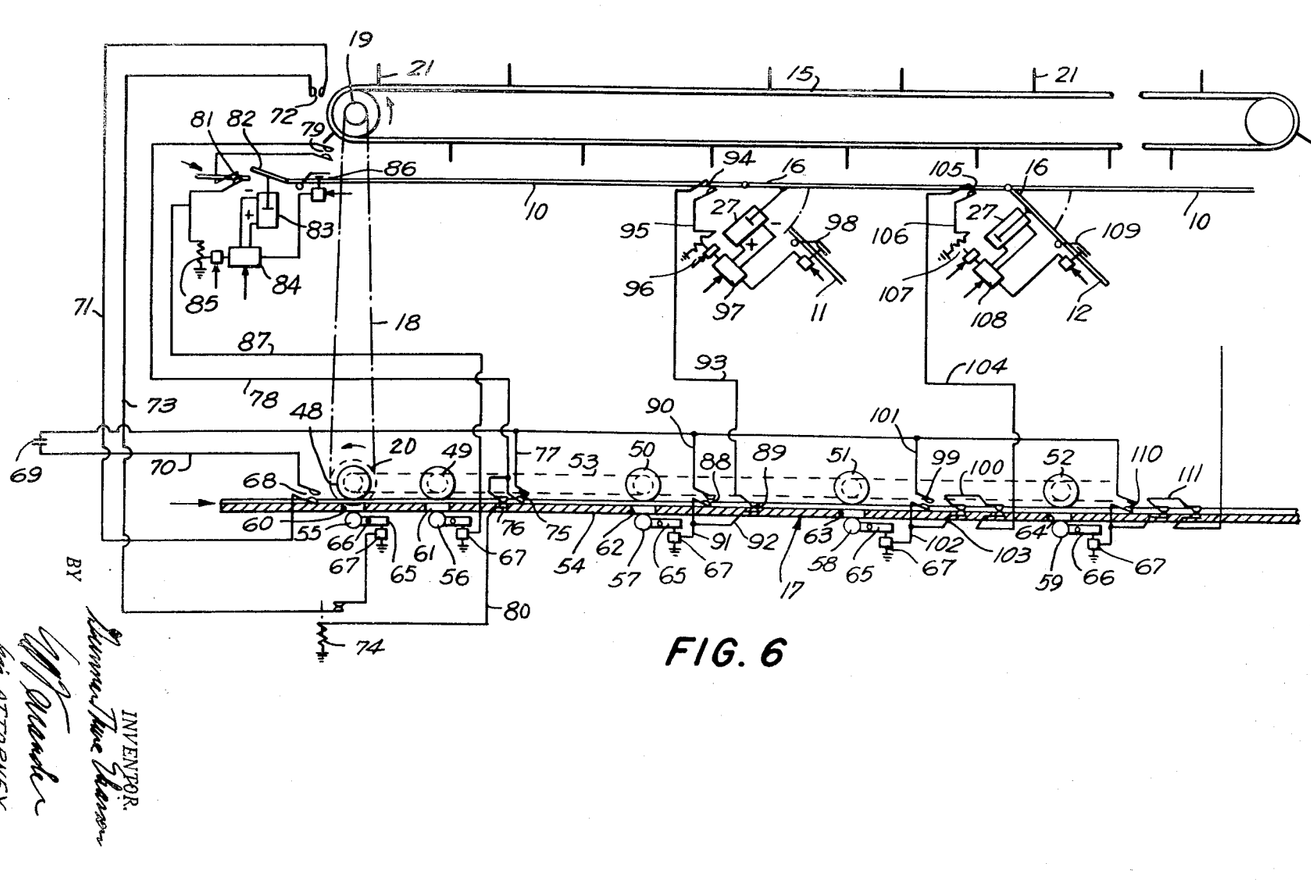
FIG. 6 is a diagrammatic representation of a control and electrical circuit therefor for controlling the movement of articles on the receiving line and the selective transfer or switching of the articles therefrom to the storage paths or lines.

An endless belt 15, which is arranged adjacent to the article receiving line 10 and driven in any suitable manner, as by an electric motor, for example, passes over spaced rollers, one of which is indicated at 19 in FIGS. 1 and 6. Members 21 are distributed along the belt 15 and extend outward therefrom. The members 21, which are equally spaced from one another on the belt 15, function to propel and horizontally move the articles on the article receiving line or path, as will be described presently. The dispatching unit 17 includes mechanism which is driven in synchronism with the article propelling belt 15 and actuated through speed reduction mechanism comprising an endless belt 18 passing over the roller 19 and a roller 20 forming a component of the dispatching unit.

Figures 7, 7A:
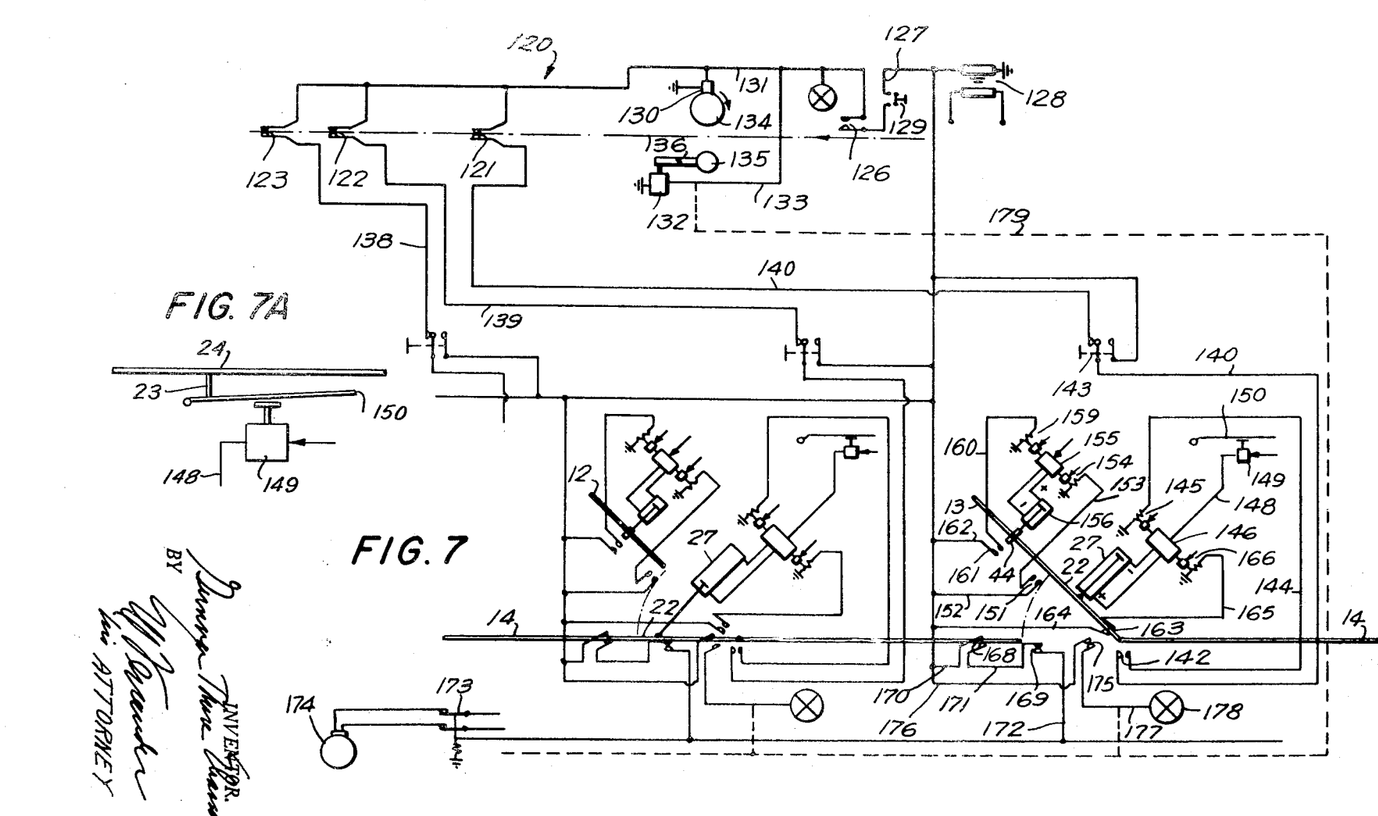
FIG. 7 is a diagrammatic representation of a control and electrical circuit therefor for controlling the selective switching or transfer of articles from the storage paths or lines to the article delivery line and the movement of the transferred articles on the delivery line.
FIG. 7A is a fragmentary view of parts shown in FIG. 7 and the manner in which they coact with the propelling members of the article delivery line.

The articles can be selectively transferred by switch or transfer units 22 from the storage paths 11, 12 and 13 to the article delivery line or path 14. An endless belt 24, which is adjacent to the article delivery line 14 and like the belt 15 and driven by a motor 174, as shown in FIG. 7, is provided with spaced members 23 which extend outward therefrom and are equally spaced from one another and function to propel and horizontally move the articles transferred to the article delivery line 14.

Figure 4:
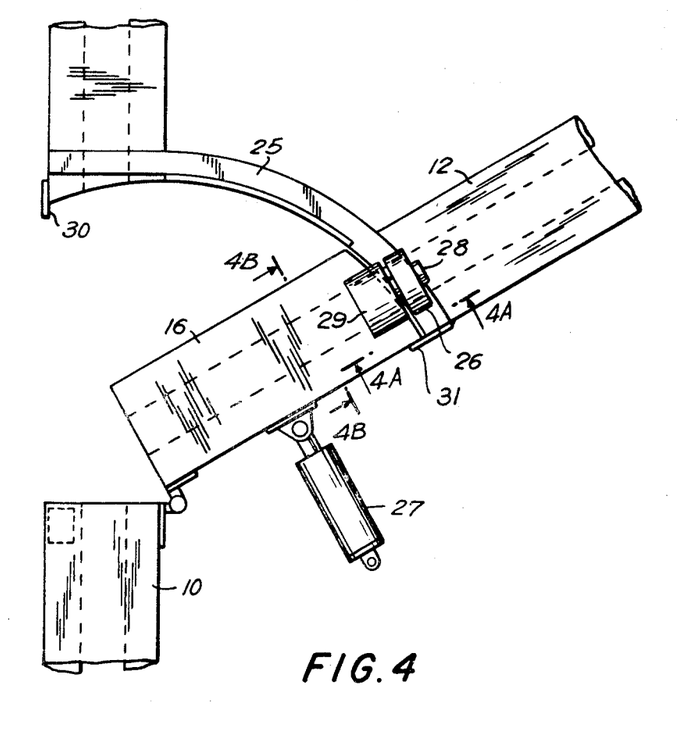
FIG. 4 is an enlarged top plan view of a transfer or switch unit of the overhead conveyor track system shown in FIG. 1 for transferring a carrier unit of the overhead conveyor track system and article carried thereby from a receiving line to a storage line.

The switch or transfer units 16 and 22 are horizontally disposed and pivotally mounted on the article receiving and delivery lines 10 and 14, respectively, and their outer ends engage and move over horizontally disposed rails 25 of arcuate form in top plan view, as shown in FIGS. 1 and 4. One end of each rail 25 is at the vicinity of the article receiving line 10 or article delivery line 14 and the other end thereof is at the vicinity of a different one of the storage paths 11, 12 and 13. I accomplish this by providing at the outer end of each switch unit 16 and 22 a roller 26 which is rotatably mounted thereon and rolls over one of the horizontally disposed rails 25 when movement is imparted to the switch unit by a pneumatically operated cylinder 27. With this arrangement, the switch or transfer units 16 and 22 can be moved from first positions in which they form a section of the article receiving or article delivery lines 10 and 14, respectively, to second positions in which they form sections of the storage paths 11, 12 and 13.

Figure 4A:
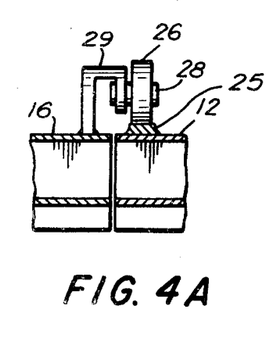
FIGS. 4A and 4B are sectional views taken at lines 4A—4A and 4B—4B, respectively, of FIG. 4.
Figure 4B:
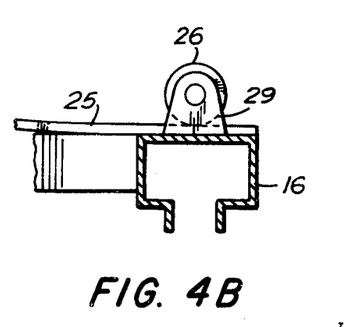

As shown in FIGS. 4 and 4A, the roller 26 is rotatably mounted on a horizontal pin 28 fixed to a bracket 29 provided at the outer end of the switch unit 16 which transfers articles from the article receiving line 10 to the storage path 12. As seen in FIG. 4B, the rail 25 from the article receiving line 10 to the storage line 12 slopes downward from the horizontal and the storage line 12 in turn slopes downward from the horizontal to the article delivery line 14. With this arrangement, articles transferred from the article receiving line 10 to the storage lines move horizontally and downwardly by gravity to the lower ends of the storage lines. As seen in FIG. 4, stops 30 and 31 are provided in the article receiving line 10 and storage paths, respectively, to limit horizontal swinging movement of the switch or transfer units and make certain that they are in proper alignment with the article receiving line and the storage line, respectively, when moved thereto.

Figure 2:
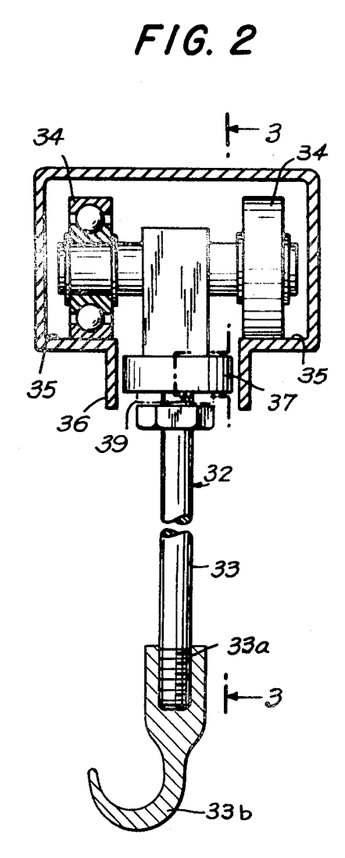
FIG. 2 is a transverse sectional view of a track illustrating one practical form the overhead track system of FIG. 1 may take and a wheeled carrier unit movable thereon.
Figure 3:
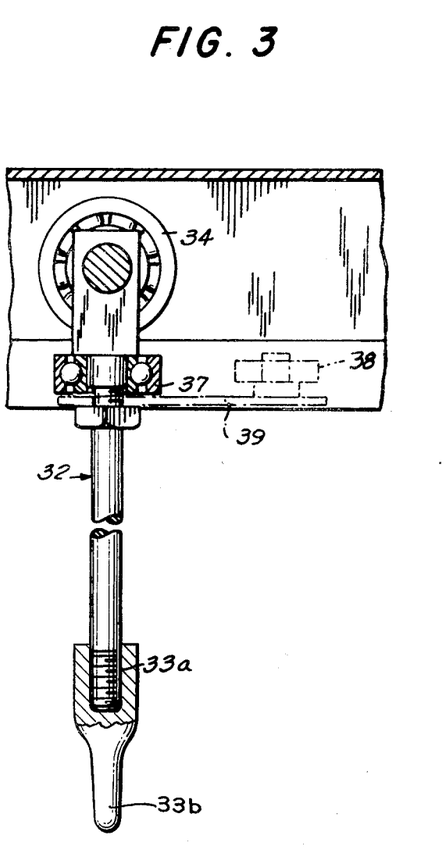
FIG. 3 is a vertical view, partly in section, taken at line 3—3 of FIG. 2.

In the embodiment being described, the articles are suspended from and carried by carrier units 32 having downwardly depending rods 33 provided with lower threaded ends 33a to which may be removably connected suitable members 33b for carrying the articles to be sorted and stored in the different storage paths. As shown in FIGS. 2 and 3, the vertical rods 33 form part of T-shaped members having top horizontal arms at the opposite ends of which are rotatably mounted wheels or rollers 34, the outer rims of which forms the outer races of ball bearings. The article receiving and delivery paths 10 and 14 and storage paths therebetween are formed of elongated members which in transverse section are rectangular and include bottom horizontal wall sections 35 which extend inward from vertical wall sections and at their inner extremities are spaced from one another and provided with downwardly extending flanges 36.

The spaced horizontal wall sections 35 serve as a horizontally extending track for the carrier units 32 over which the wheels 34 move. Rollers 37, the outer rims of which form the outer races of ball bearings, are provided on the vertical rods 33 between the vertical flanges 36 to guide the carrier units 32 during their horizontal movement on the horizontal wall sections 35. The vertical rod 33 of each carrier unit extends through an opening formed at one end of a holder 39 which extends lengthwise of the flanges 36 and in the gap therebetween. The holders 39 are held on the vertical rods 33 at the level of the flanges 36 and at their outer ends are provided with ball bearings 38, as indicated in dotted lines in FIG. 3, which are similar to the ball bearings 37. The ball bearings 38 function to guide the carrier units 32 between the flanges 36 and may be disposed ahead of or to the rear of the carrier units during their movement on the article receiving and delivery paths and on the storage paths.

Figure 5:
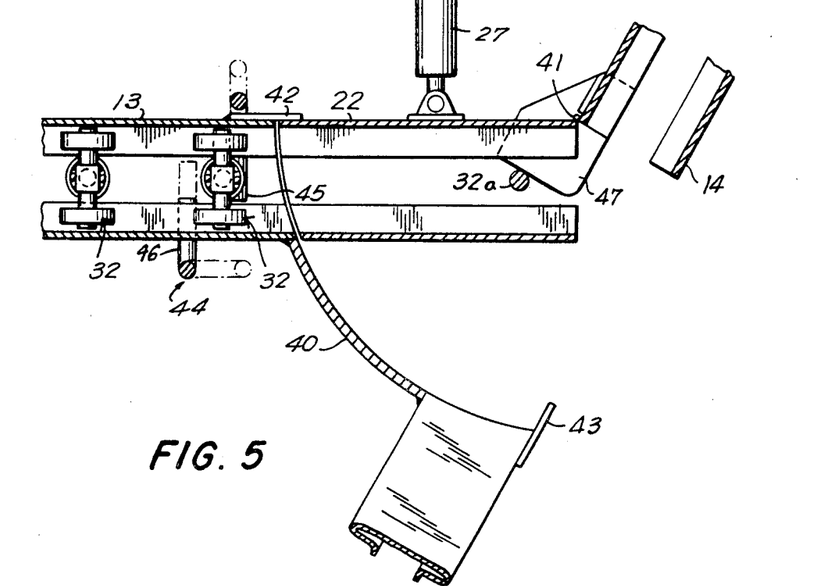
FIG. 5 is an enlarged top plan view, partly broken away and in section, of a transfer or switch unit of the overhead conveyor track system shown in FIG. 1 for transferring a carrier unit and article carried thereby from a storage line to a delivery line.
Figures 5A, 5B:
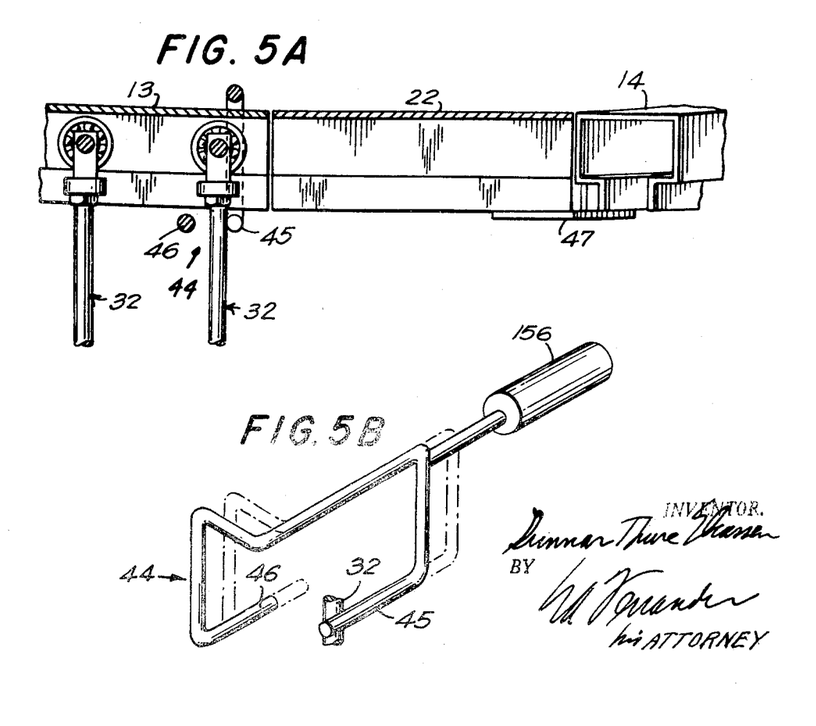
FIG. 5A is a vertical sectional view of the switch or transfer unit shown in FIG. 5.
FIG. 5B is a fragmentary perspective view of details illustrated in FIGS. 5 and 5A and a component of the operating mechanism therefor.

The switch or transfer unit 22 for transferring articles from one of the storage paths 13 to the article delivery line 14 is shown in FIGS. 5 and 5A. The rail 25 for the switch unit is not seen in FIG. 5 in order to illustrate a vertical reinforcing rib 40 for the rail which is of arcuate form and at the underside thereof. The switch unit 22 is horizontally disposed and pivotally mounted on the article delivery line 14 at 41 and is horizontally movable between the storage path 13 to a position where it becomes a part of the article delivery line 14 by a pneumatically operated cylinder 27. Stops 42 and 43 are provided on the storage path 13 and on the article delivery line 14, respectively, to limit movement of the switch unit 22 between its extreme end positions at the storage path and article delivery line.

The lower ends of the horizontally extending storage paths 11, 12 and 13 are provided with devices which function to stop the carrier units 32 moving horizontally downward on the paths by gravity. Such a device 44 is shown in FIGS. 5 and 5A at the lower end of the storage path 13. The device 44 is located in front of the outer extremity of the pivotally mounted switch unit 22 and functions in such manner that only one carrier unit 32 can advance onto the switch unit when it is in alignment with the storage path and forward movement of the leading carrier unit 32 on the storage passage is blocked when the switch unit 22 forms a component of the article delivery line 14 and is in alignment therewith.

As seen in FIGS. 5, 5A and 5B, the device 44 comprises rods 45 and 46 which are disposed at opposite sides of the storage path 13 and have horizontal arms movable into and out of the path of movement of the carrier units 32. In the solid line positions of the rods 45 and 46 in FIG. 5, the rod 45 is in the path of movement of the leading carrier unit 32 and blocks forward movement thereof. The rod 46 is out of the path of movement of the carrier units 32 which will permit the second carrier unit 32 to move forward on the storage path until it is stopped by the leading carrier unit 32.

When the switch unit 22 is in the position shown in FIG. 5 and it is desired to transfer the leading carrier unit 32 from the storage path to the article delivery line 14, the device 44 is actuated whereby the rod 45 is retracted to a position out of the path of movement of the leading carrier unit 32, as indicated by the dotted lines in FIGS. 5 and 5B, thereby permitting the leading carrier unit to advance by gravity onto the switch unit 22. At the same time the rod 45 is retracted out of the path of movement of the leading carrier unit 32, the rod 46 is moved to the dotted line position in FIGS. 5 and 5B between the leading carrier unit and the carrier unit behind it, thereby preventing forward movement of the second carrier unit on the storage path. The rod 46 can move to its dotted line position in FIGS. 5 and 5B because the first and second carrier units are separated by the holder 39 and ball bearing 38 carried by one of the carrier units and extending toward and engaging the other of the carrier units.

After the leading carrier unit 32 has advanced onto the switch 22, the device 44 can be actuated to return rod 45 to its solid line position in FIGS. 5 and 5B, after which the rod 46 can be retracted to its solid line position, whereby the second carrier unit 32 can move forward on the storage path 13 until it is stopped by the rod 45. Although I have not shown mechanism for actuating the rods 45 and 46 in and out of the path of movement of the carrier units 32 in the manner just described, it will be understood that the device 44 can be operated pneumatically by compressed air in a manner which will be described hereinafter, and that the rods 45 and 46 may form components of a single control operable to impart back and forth movement to the rods.

A stationary plate 47 is provided at the zone the switch unit 22 is pivotally mounted at 41 on the article delivery line 14. As shown in FIG. 5, the carrier unit 32 advancing onto the switch unit 22 strikes a forward edge of the plate 47 which is inclined at an acute angle to the direction of movement of the carrier unit. In FIG. 5 the forward part of the carrier unit is indicated schematically at 32a to illustrate more clearly the forward edge of the plate 47 contacted by the carrier unit. When the switch unit 22 is moved about its pivot at 41 to transfer the carrier unit thereon to the article delivery line 14, the carrier unit will slide over the forward edge of the blocking plate 47 and eventually will clear the blocking plate when the switch unit is in its position against the stop 43 and forms a component of the article delivery line. When this occurs, one of the members 23 on the belt 24 becomes operable to propel the transferred carrier unit 32 on the article delivery line 14, the upper end of the vertical rod 33 of the carrier unit being in the path of movement of the one member 23 whereby the latter propels and moves the carrier unit along the article delivery path.

FIG. 6 diagrammatically represents control provisions and an electric circuit therefor for controlling the movement of articles on the article receiving line 10 and the selective transfer or switching of the articles therefrom to the storage paths or lines 11 and 12, the storage path 13 being omitted since it is not necessary for an understanding of the invention. In FIG. 6 it will be seen that the roller 20 of the dispatching unit 17 is driven by an endless belt 18 from the roller 19, as previously explained. The dispatching unit 17 is of a type to which punched cards can be fed to cause the switch units 16 to function in a selective manner to transfer articles from the article receiving line 10 to the storage paths. Each punched card fed to the dispatching unit 17 includes dispatching information which functions to cause the control mechanism to operate in a particular manner, whereby a particular switch unit 16 becomes operable to selectively transfer a designated article automatically from the article receiving line 10 to a particular storage path.

The dispatching unit 17 comprises a plurality of rollers 48, 49, 50, 51 and 52 which are horizontally spaced from one another, the rollers 48 being driven by the roller 20 over which the endless belt 20 passes. An endless chain 53 driven by the roller 48 is employed to drive the rollers 49, 50, 51 and 52. With this arrangement all of the rollers 48, 49, 50, 51 and 52 are driven at the same peripheral speed and in synchronism with the belt 15.

The dispatching unit 17 includes a horizontal plate 54 which function as a support for punched cards or other material which includes dispatching information, the gap between the plate 54 and the rollers 48, 49, 50, 51 and 52 being slightly greater than the thickness of the punched cards. At the underside of the plate 54 and in vertical alignment with the rollers 49, 49, 50, 51 and 52 are provided a second horizontal row of rollers 55, 56, 57, 58 and 59, which may be referred to as pressure rollers. The plate 54 is formed with a series of holes or openings 60, 61, 62, 63 and 64, each of which is in alignment wih a pair of rollers directly opposite one another and above and below the plate, respectively. Each pressure roller is movable into the opening or hole adjacent thereto and engages or contacts the underside of a punched card and moves the card against the rollers 48, 49, 50, 51 and 52.

Each pressure roller 55, 56, 57, 58 and 59 is mounted for rotation at one end of a lever 65 which is pivoted intermediate its ends at 66. Hence, each lever 65 rocks about the pivot 66 and the pressure roller thereon is freely rotatable adjacent to one of the openings in the plate 54. The opposite end of each lever 65 is connected to an actuating member 67, such as an electrical solenoid, for example.

A contact breaker 68 in front of the first roller 58 is acted upon by a punched card when it is slid on the top surface of the plate 54 toward the gap between the plate and the first roller 48, in the direction of the arrow at the left end of the plate 54. When this occurs the punched card is moved between the first pair of rollers 48 and 55 and the second pair of rollers 49 and 56. The punched card closes the contact breaker 68. When one of the article propelling members 21 on the belt 15 becomes operable to close a cotnact breaker 72, a circuit will be completed from a source of electrical supply 69 through conductor 70, contact breaker 68, conductor 71, contact breaker 72, conductor 73, relay 74 and solenoid 67. When the solenoid 67 is energized it attracts one end of the lever 65 whereby the roller 55 at its opposite end is moved upward into the opening 60 against the roller 48 and the latter is rendered operable to move the punched card toward the right in FIG. 6.

Two contact breakers 75 and 76 are provided at the right side of the roller 49. The contact breaker 75 is connected by a conductor 77 with the source of electrical supply 69, such as a transformer, for example, and by a conductor 78 to a contact breaker 79 which is actuated by the members 21 on the belt 15. The contact breaker 76 is connected to the contact breaker 75 and by a conductor 80 to the relay 74. When a punched card advances on the plate 54 so that a marking hole therein moves into position in front of the contact breaker 76, this contact breaker will complete a circuit through the conductor 80 to the relay 74 and open the circuit for the solenoid 67. When this occurs the lever 65 rocks about its pivot and the pressure roller 55 moves downward, whereby the punched card stops moving. The contact breaker 72 is actuated by a member 21 and is closed until the solenoid 67 becomes de-energized and the punched card stops moving.

While the punched card is stationary and the marking hole therein is opposite the contact breaker 76, the member 21 on the belt 15 continues to move toward a contact breaker 79. The contact breaker 79 is connected to a contact breaker 81 actuated by the carrier units 32 at the end of the article receiving line 10 at which the articles are adapted to be supplied thereto in any suitable manner (not shown). The contact breaker 81 is in front of a stop 82 which functions to advance one carrier unit 32 at a time on the article receiving line 10. The stop 82 is operated by a pneumatic cylinder 83 under the control of a master air control valve 84. A solenoid-operated valve 85 is connected to the contact breaker 81 which in turn is connected by conductor 87 to the solenoid 67 associated with the pressure roller 56.

When an article propelling member 21 on the belt 15 closes the contact breaker 79 and at the same time the contact breaker 81 is closed by the action of a carrier unit 32, an electrical circuit will be completed for the solenoid-operated valve 85 and also for the solenoid 67 operatively associated with the pressure roller 56.

When solenoid-operated valve 85 is energized, a pilot air control system of which the valve 85 is a part becomes operable to cause the master air control valve 84 to function to render the pneumatic cylinder 83 operable to move the stop 82 to permit a carrier unit 32 to advance on the article receiving line 10. The carrier unit 32 advanced on receiving line 10 then becomes operable to act on a pilot valve 86. The pilot valve 86 is a part of a pilot air control system which now becomes operable to cause the master air control valve 84 to function to render the pneumatic cylinder 83 operable to raise the stop 82. The member 21 on the belt 15 now becomes operable to propel a carrier unit 32 on the article receiving line 10.

As just explained, an electrical circuit will be completed through conductor 87 for the solenoid 67 when the stop 82 is actuated. When this occurs the pressure roller 56 moves upward against the roller 49 to render the latter operable to feed the punched card to the right. Under these conditions, movement of the movable member 21, which propels and moves a carrier unit 32, and movement of the punched card are synchronized.

Two contact breakers 88 and 89 are located at the rightside of the drive roller 50, the contact breaker 88 being connected by the conductor 90 to the source of electrical supply 69 and by the conductor 91 to the solenoid 67 associated with the pressure roller 57. The contact breaker 88 is actuated by the front edge of the punched card and completes a circuit for the solenoid 67, whereby the lever 65 rocks about its pivot and moves the pressure roller 59 through the opening 62 in the plate 54 to force the punched card against the roller 50 and render the latter operable to drive the punched card. The contact breaker 75 opens when it is no longer acted upon by the punched card.

The contact breaker 89 is connected by the conductor 92 to the conductor 91 of the contact breaker 88 and by a conductor 93 to a contact breaker 94 at the vicinity of the article receiving line 10. The contact breaker 94, which is actuated by carrier units 32 moving on the article receiving line 10, is located immediately in front of the switch or transfer unit 16 associated with the storage path 11.

The switch unit 16 is operated by the pneumatic cylinder 27 under the control of a master air control valve 97. A solenoid-operated valve 96 is connected by conductor 95 to the contact breaker 94. When one of the carrier units 32, with one or more articles thereon, is propelled and moved on the receiving line 10 by the propelling members 21 of the belt 15 and actuates the contact breaker 94, the punched card has moved such a distance on the plate 54 that a hole or opening therein, which designates the storage path to which a carrier unit 32 is to be directed from the receiving line 10, reaches a point in the travel of the punched card which enables contact breaker 89 to be actuated. This completes a circuit for the solenoid-operated valve 96 from the contact breaker 88 through conductor 92, contact breaker 89, conductor 93, contact breaker 94 and conductor 95 to solenoid-operated valve 96. When solenoid-operated valve 96 is energized, a pilot air control system of which the valve 96 is a part becomes operable to cause the master air control valve 97 to function to render the pneumatic cylinder 27 operable to actuate the switching unit 16 it move t from a position in alignment with the receiving line 10 to a position in alignment with the storage path. The carrier unit 32 diverted from the line 10 by the switch unit 16 to the storage path 11 moves downward by gravity and on the storage path the diverted carrier unit 32 actuates a pilot valve 98. The pilot valve 98 is a part of a pilot air control system which now becomes operable to cause the master air control valve 97 to function to render the pneumatic cylinder 27 operable to move the switch unit 16 from the storage path 11 to the article receiving line 10 in alignment therewith.

The punched card in the dispatching unit 17 now has advanced on the plate 54 to the next drive roller 51 and pressure roller 58. Contact breakers 99 and 100 are located at the right side of the roller 51. These contact breakers correspond to contact breakers 88 and 89 at the right side of the drive roller 50. The contact breaker 99 is connected by a conductor 101 to the source of electrical supply 69 and by the conductor 102 to the solenoid 67 associated with the pressure roller 58. The contact breaker 100 is connected by a conductor 103 to the contact breaker 99 and by a conductor 104 to a contact breaker 105 at the vicinity of the article receiving line 10. The contact breaker 105 is connected by a conductor 106 to a solenoid-operated valve 107 which is associated with a pilot air control system and, when energized, causes a master air control valve 108 to function to render the pneumatic cylinder 27 operable to actuate the switching unit 16 at the storage path 12 to divert a carrier unit 32 to this storage path when the carrier unit actuates the contact breaker 105. After the carrier unit 32 has been diverted to the storage path 12, it actuates a pilot valve 109 which is associated with a pilot air control system and now becomes operable to cause the master air control valve 108 to function to render the pneumatic cylinder 27 operable to move the switch unit 16 from the storage path 12 to the article receiving line 10 in alignment therewith.

The contact breaker 99 is actuated by the front edge of the punched card and completes a circuit for the solenoid 67, whereby the pressure roller 58 at the end of lever 65 moves through the opening 63 to force the punched card against the drive roller 51 and render the latter operable to drive the punched card. Let us assume that a carrier unit 32 on the line 10 has actuated the contact breaker 105. If no marking hole in the punched card is located at the contact breaker 100 to enable it to be actuated at the same time that contact breaker 105 is actuated, the air cylinder 27 is not rendered operable to move the switching unit 16 to shift or transfer the carrier unit 32 from the line 10 to the storage path 12 and the carrier unit 32 will continue to move on the article receiving line 10. If a marking hole in the punched card is located at the contact breaker 100 at the same time that contact breaker 105 is actuated, thus permitting contact breaker 100 to be actuated, the pneumatic cylinder 27 will be rendered operable to move the switch unit 16 from the line 10 to the storage path 12 in the same manner that a carrier unit 32 is diverted to storage path 11, as explained above.

Two contact breakers 110 and 111 are located at the right side of the drive roller 52. A pressure roller 59 cooperates with the drive roller 52 through an opening 64 in the plate 54. The contact breaker 111 is operatively associated with parts (not shown), which are like the parts 94 to 98 and 105 to 109 described above, for operating a switch unit 16 associated with the storage path 13 for diverting thereto carrier units 32 moving on the receiving line 10. The number of cooperating drive rollers and pressure rollers and control provisions associated therewith which are necessary will, of course, depend upon the number of storage paths embodied in the conveyor system.

FIG. 7 diagrammatically represents control provisions and an electrical circuit therefor for controlling the selective transfer or switching of articles from the storage paths 12 and 13 to the article delivery line 14, the storage path 11 being omitted since it is not necessary for an understanding of the invention. A dispatching unit 120 operated by punched cards is employed to selectively operate the switches 22 for transferring carrier units 32 from the storage paths to the delivery line 14. The dispatching unit 120 comprises a plurality of contact breakers 121, 122 and 123 past which punched cards are fed from right to left, as indicated by the arrow in FIG. 7.

The dispatching unit 120 also includes a contact breaker 126 which is actuated when a punched card is fed to the unit. The contact breaker 126 is connected by a conductor 127 to a source of electrical supply 128, a manually operable switch 129 being provided on the conductor 127. The contact breaker 126 is connected by a conductor 131 to a motor 130 and arranged to drive a roller 134, and by a conductor 133 to a solenoid 132 operatively connected to one end of a lever 136 which is pivoted intermediate its ends and to the other end of which a pressure roller 135 is mounted for rotation thereon.

The contact breaker 126 completes a circuit for the motor 130 and solenoid 132 and connects one side of the contact breakers 121, 122 and 123 to the source of electrical supply 128 responsive to feeding of a punch card to the dispatching unit 120. The pressure roller 135 forces the punched card against the driving roller 134 and renders the latter operable to move the punched card to the left. The punched cards are provided with holes which may be referred to as dispatching information to cause the switch units 22 to function in a selective manner to transfer articles from the storage paths to the delivery line 14. The contact breakers 121, 122 and 123 are connected by conductors 138, 139 and 140 to controls which are associated with the switch units 22 for the storage paths 11, 12 and 13, respectively, and will now be described.

Let us assume that the punched card fed to the dispatching unit 120 is provided with a hole which enables the contact breaker 121 to complete a circuit to initiate operation of the switch unit 22 for the storage path 13, such circuit including the conductor 140. While the switch unit 22 for the storage path 13 is diagrammatically shown in alignment with the storage path and moved from the article delivery line 14 in FIG. 7, let us assume for the moment that this switch unit forms a component of the article delivery line 14 and is in alignment therewith. In such case, the switch unit 22 actuates contact breaker 142 which is connected by the conductor 140 to the contact breaker 121 of the dispatching unit 120. A manual contact 143 is provided in the conductor 140 which permits an operator to by-pass the dispatching unit 120 and connect conductor 140 directly to the source of electrical supply 128 to operate the switch unit 22 in the event this becomes necessary.

The contact breaker 142 is connected by a conductor 144 to a solenoid-operated valve 145 to complete a circuit which is closed when contact breaker 142 is actuated by the switch unit 22 when it forms a part of the delivery line 14. The solenoid-operated valve 145 is associated with a pilot air control system and, when energized, causes a master air control valve 146 to function in a manner which will be described presently. The master air controll valve 146 is connected by a conduit 148 to a master air power source through which the flow of high pressure air is controlled by a valve 149 having an operating member 150 which is actuated at the proper time by a member 23 on the belt 24, as seen in FIG. 7A. Let us assume that one of the members 23, which may or may not be propelling and moving a carrier unit 32 on the article delivery line 14, is moving onto the switch unit 22 forming a part of a zone of the delivery line. Under these conditions it is not desirable to shift the switch unit 22 from the delivery line 14 to the storage path 13 even when the contact breaker 121 of the dispatching unit 120 is rendered operable to connect conductor 140 to the source of electrical supply 128. Accordingly, the control valve 149 remains closed and renders master control valve 146 ineffective when a propelling member 23 is approaching and moving onto a switch unit. However, when the member 23 passes a switch unit 22 it acts upon a lever 150 which may be the same length as a switch unit 22. When this occurs control valve 149 opens and high pressure air can flow o the master air control valve 146, and, assuming that solenoid-operated valve 145 is energized, the master control valve 146 will function to render the pneumatic cylinder 27 operable to shift the switch unit 22 from the article delivery line 14 to a position in alignment with the storage path 13, as diagrammatically shown in FIG. 7.

When the switch unit 22 is moved to a position in alignment with the storage path 13, a contact breaker 151 is actuated which completes an electrical circuit to initiate operation of control mechanism to operate the stop device 44 shown in FIGS. 5, 5A and 5B and described above. The contact breaker 151 is connected by a conductor 152 to the source of electrical supply 128, and by a conductor 153 to a solenoid-operated valve 154 which is associated with a pilot air control system and, when energized, causes a master control valve 155 to function to render the pneumatic cylinder 156 operable to actuate the stop device 44. When this occurs the rod 45 will be retracted from its position in the path of movement of the leading carrier unit 32 on the storage path 13 as indicated by the dotted lines in FIGS. 5 and 5B, and permit the leading carrier unit 32 to move by gravity and advance onto the switch unit 22. At the same time that rod 45 is retracted the rod 46 of the stop device 44 is moved inward to its dotted line position in FIGS. 5 and 5B to hold back the carrier unit 32 behind the leading carrier unit 32.

In the retracted position of the rod 45 of the stop device 44, the latter actuates a contact breaker 161 which is connected by a conductor 162 to the source of electrical supply 128, and by a conductor 160 to a solenoid-operated valve 159. The solenoid-operated valve 159 is associated with a pilot air control system and, when energized, causes the master control valve 155 to function to render the pneumatic cylinder 156 operable to cause the rod 45 of the stop device 44 to become effective to stop movement of the leading carrier unit 32 on the storage path 13. After the rod 45 is moved into the path of movement of the leading carrier unit the rod 46 is retracted from its dotted line to its solid line position shown in FIGS. 5 and 5B.

When the leading carrier unit 32 advances on the switch unit 22 it actuates a contact breaker 163 connected by a conductor 164 to the source of electrical supply 128 and by the conductor 165 to a solenoid-operated valve 166. The solenoid-operated valve 166 is associated with a pilot air control system and, when energized, causes master air control valve 146 to function to render the pneumatic cylinder 27 operable to move the switch unit 22 from its position at the storage path 13 to its position at the article delivery line 14 where it forms a component thereof.

In order to prevent carrier units 32 moving on the article delivery line 14 from falling into an open space therein when a switch unit 22 has been moved from the delivery line to a position at which it cooperates with a storage path, I provide a first contact breaker 168 in front of a switch unit 22 and a second contact breaker 169 in the open space in the delivery line 14 which becomes effective when the switch unit 22 has been moved therefrom to cooperate with a storage path. The contact breaker 168 is connected by a conductor 170 to the source of electrical supply 128, and by a conductor 171 to the second contact breaker 169 which in turn is connected by a conductor 172 to a coil of a relay 173 which connects to a source of electrical energy a motor 174 for driving the belt 24 to which the propelling members 23 are fixed. When a carrier unit 32 actuates the contact breaker 168 and the switch unit 22 has been moved from the delivery line 14 to form an open space therein, a circuit will be completed through contact breaker 168 and the contact breaker 169, which is normally closed when the switch unit 22 has been moved out of the delivery line 14, to energize relay 173 and cause the latter to open the circuit to the motor 174. When the switch unit 22 moves back to its closed position in the delivery line 14, the contact breaker 169 opens and renders relay 173 ineffective to disconnect the motor 174 from its source of electrical energy.

Another contact breaker 175 may be located in the open space in the delivery line 14 which becomes effective when the switch unit 22 has been moved to cooperate with the storage path 13. The contact breaker 175, which is closed when the open space in the delivery line 14 is formed and open when the switch unit 22 is moved to close the open space and form a component of the delivery line 14, is connected by a conductor 176 to the source of electrical supply 128 and by a conductor 177 to a signal lamp 178. Therefore, a circuit will be completed for the lamp 178 only when the switch unit 22 has been moved to a position in which it cooperates with the storage path 13. Alternatively, the contact breaker 175 may be connected by a conductor 179 to the conductor 133 of the circuit for the solenoid 132. With this arrangement the solenoid 132 will be rendered ineffective to move the pressure roller 135 against the drive roller 134 and the latter cannot function to move punched cards in the direction of the arrow when the switch unit 22 has been moved from the delivery line 14 and the contact breaker 175 closes to complete a circuit through conductor 179. When this occurs the solenoid 132 is short-circuited and the dispatching unit 120 is rendered inoperable.

Although I have illustrated and described a particular embodiment of my invention, I do not desire to be limited to the particular arrangement set forth, and I intend in the following claims to cover all modifications which do not depart from the spirit and scope of my invention.

I claim:
1. A conveyor system including
   (a) an article delivery line comprising a horizontal track,
   (b) a plurality of stationary storage paths which are transverse to said track,
   (c) carrier units for carrying articles thereon,
   (d) means for moving the carrier units on said track,
   (e) the carrier units moving downward by gravity on said storage paths which slope downward from the horizontal,
   (f) said track having a plurality of gaps spaced from one another,
   (g) a plurality of switch units,
   (h) means for mounting said switch units on said track for angular movement thereon,
   (i) said switch units being angularly movable on said track to first positions in which each of said switch units closes a different one of said gaps and is parallel to and forms a part of said track or to second positions in which each of said switch units opens a different one of said gaps and is at an angle to said track and has its outer free end arranged to receive carrier units from the lower end of a different one of said storage paths,
   (j) said carrier units moving downward by gravity on said switch units which slope downward from the horizontal,
   (k) a plurality of first means each functioning to move a different one of said switch units from its first position to its second position and enable a carrier unit at the lower end of said storage path associated with each such switch unit to move onto said switch unit for downward gravity movement thereon,
   (l) a plurality of second means each responsive to movement of a carrier unit on a different one of said switch units for moving said each such switch unit from its second position to its first position and enable the carrier unit thereon to move onto said track when said each such switch unit moves to its first position,
   (m) said means for moving the carrier units on said track comprising propelling members which are spaced apart and movable lengthwise of said track, and
   (n) a plurality of third means each functioning responsive to an operating condition at the vicinity of a different one of said switch units to render said first means, which is associated with a particular switch unit having said operating condition, ineffective to move such switch unit from its first position to its second position,
   (o) said operating condition comprising the presence of at least one of said propelling members, even when it is not functioning to propel a carrier unit, along a zone of said track which includes said particular switch unit.

2. A conveyor system as set forth in claim 1 in which each of said third means is rendered ineffective to prevent each of said first means from moving said switch unit associated therewith from its first position to its second position when the operating condition no longer exists.

3. A conveyor system as set forth in claim 1 in which each of said third means is rendered ineffective to prevent each of said first means from moving said switch unit associated therewith from its first position to its second position when said zone of said track is free of said propelling members.

4. A conveyor system as set forth in claim 1 which includes a plurality of fourth means each associated with a different one of said switch units and functioning to stop said means for moving said carrier units on said track responsive to movement of a carrier unit approaching a gap in said track resulting from movement of one of said switch units by one of said first means from its first position to its second position.

5. A conveyor system as set forth in claim 4 in which each of said fourth means is rendered inoperable to stop said means for moving said carrier units on said track responsive to movement of said one switch unit from its second position to its first position to form a part of said track and close the gap.

6. A conveyor system as set forth in claim 4 which includess an electrically operable signaling device, and a plurality of fifth means each associated with a different one of said switch units and operable to energize said device responsive to movement of each such switch unit from its first position to its second position.

7. A conveyor system as set forth in claim 1 including a control unit for selectively rendering a particular first means operable and capable of functioning to move said switch unit associated therewith from its first position to its second position.

8. A conveyor system as set forth in claim 7 which includes structure for rendering said control unit inoperable, and a plurality of fifth means each associated with a different one of said switch units and functioning to render said control unit inoperable by said structure responsive to movement of each such switch unit from its first position to its second position.

References Cited

UNITED STATES PATENTS

| 3,048,123 | 8/1962 | Burmeister et al. | 104—88 |
| 3,089,432 | 5/1963 | McKee et al. | 104—88 |
| 3,361,079 | 1/1968 | Eliassen | 104—88 |

ANDREW H. FARRELL, Primary Examiner

U.S. Cl. X.R.

104—89, 91